United States Patent
Grandhe et al.

(10) Patent No.: US 12,494,956 B2
(45) Date of Patent: Dec. 9, 2025

(54) 11AZ SOUNDING LSIG LENGTH CALCULATION METHOD AND APPARATUS

(71) Applicant: NXP USA, Inc., Austin, TX (US)

(72) Inventors: Niranjan Grandhe, San Jose, CA (US); Christian Raimund Berger, San Jose, CA (US); Hongyuan Zhang, Fremont, CA (US); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 520 days.

(21) Appl. No.: 17/882,505

(22) Filed: Aug. 5, 2022

(65) Prior Publication Data

US 2023/0051675 A1 Feb. 16, 2023

Related U.S. Application Data (60) Provisional application No. 63/229,627, filed on Aug. 5, 2021.

(51) Int. Cl.
H04L 27/26 (2006.01)
H04W 72/21 (2023.01)
H04W 84/02 (2009.01)

(52) U.S. Cl.
CPC .... H04L 27/26132 (2021.01); H04L 27/2605 (2013.01); H04L 27/26136 (2021.01); H04W 72/21 (2023.01); H04W 84/02 (2013.01)

(58) Field of Classification Search
CPC ... H04W 72/21; H04W 84/02; H04W 64/003; H04W 74/06; H04L 27/26132; H04L 27/26136; H04L 27/2605

USPC .......................................................... 370/329
See application file for complete search history.

(56) References Cited

U.S. PATENT DOCUMENTS

| | | | |
|---|---|---|---|
| 10,935,664 B2 | 3/2021 | Berger et al. | |
| 11,102,721 B2 | 8/2021 | Park | |
| 2014/0334420 A1* | 11/2014 | You | H04L 27/2607 370/329 |
| 2017/0303280 A1* | 10/2017 | Chun | H04L 5/0094 |
| 2019/0132155 A1* | 5/2019 | Jiang | H04W 74/08 |
| 2020/0132857 A1* | 4/2020 | Berger | H04W 64/003 |

(Continued)

OTHER PUBLICATIONS

RF Wireless World, WLAN 802.11ax Frame Structure | 802.11ax PPDU formats, downloaded from the Internet Aug. 5, 2022, https://www.rfwireless-world.com/Terminology/WLAN-802-11ax-frame-structure.html.

(Continued)

*Primary Examiner* — Jungwon Chang (57) ABSTRACT

In an 802.11az wireless system, a first station device transmits an NDP PPDU data unit in accordance with a range measurement packet exchange by constructing the NDP PPDU data unit to include an uplink (UL) length field element or a legacy signal length (LLEN) field element derived from a specified number of symbols ($N_{HE-LTF}$) and number of repetitions ($N_{LTF-REP}$) for the NDP PPDU data unit, and then sending the NDP PPDU data unit to a second STA device, where the values of the UL-length and LLEN field elements are computed as UL-Length=LLEN=10+y+ $6*\Sigma_{i=1}^{NUM\_USERS}((N_{LTF-REP}(i)+1)*N_{HE-LTF}(i))$, where y=0 for NTB I2R/R2I NDP and TB R2I NDP PPDUs, and where y=3 for TB-I2R NDP PPDUs.

20 Claims, 7 Drawing Sheets

WLAN 802.11az HE PPDU formats

(56) References Cited

U.S. PATENT DOCUMENTS

| | | | |
|---|---|---|---|
| 2020/0212969 A1 | 7/2020 | Park et al. | |
| 2021/0105157 A1* | 4/2021 | Yuan | H04L 25/0242 |
| 2021/0195540 A1 | 6/2021 | Fischer | |
| 2021/0211326 A1 | 7/2021 | Jiang et al. | |
| 2021/0385115 A1 | 12/2021 | Cao et al. | |
| 2022/0038241 A1* | 2/2022 | Vermani | H04L 5/0055 |
| 2022/0045889 A1 | 2/2022 | Yu et al. | |
| 2022/0124884 A1 | 4/2022 | Segev et al. | |
| 2022/0174675 A1 | 6/2022 | Chu et al. | |
| 2022/0182273 A1 | 6/2022 | Huang et al. | |
| 2023/0276415 A1* | 8/2023 | Ko | H04W 74/06 370/329 |
| 2023/0319851 A1* | 10/2023 | Shilo | H04L 5/0044 370/329 |

OTHER PUBLICATIONS

Roy Want et al., IEEE P802.11 Wireless LANs, TGaz Ad Hoc Meeting Minutes, Santa Clara, CA, Jun. 26-28, 2019.

Christian Berger, IEEE P802.11 Wireless LANs, Comment Resolution SA1—Various Part 2, Jan. 2022.

mathworks.com, 802.11az Positioning Using Super-Resolution Time of Arrival Estimation, downloaded from the Internet Jul. 6, 2022.

Evgeny Khorov et al., A Tutorial on IEEE 802.11ax High Efficiency WLANs, IEEE Communications Surveys & Tutorials, vol. 21, No. 1, First Quarter 2019.

IEEE P802.11az™/D3.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for positioning, Jan. 2021.

IEEE P802.11az™/D5.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for positioning, May 2022.

IEEE P802.11ax™/D8.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Oct. 2020.

* cited by examiner

| $N_{HE-LTF}$ \ $N_{LTF-REP}$ | 0 | 1 | 2 | 3 | 4 | 5 | 6 | 7 |
|---|---|---|---|---|---|---|---|---|
| 1 | 16 | 22 | 28 | 34 | 40 | 46 | 52 | 58 |
| 2 | 22 | 34 | 46 | 58 | 70 | 82 | 94 | 106 |
| 4 | 34 | 58 | 82 | 106 | 130 | 154 | 178 | 202 |
| 6 | 46 | 82 | 118 | 154 | 190 | 226 | 262 | 298 |
| 8 | 58 | 106 | 154 | 202 | 250 | 298 | 346 | 394 |

LSIG LENGTH for I2R/R2I NTB NDP and R2I TB NDP

| $N_{HE-LTF}$ \ $N_{LTF-REP}$ | 0 | 1 | 2 | 3 | 4 | 5 | 6 | 7 |
|---|---|---|---|---|---|---|---|---|
| 1 | 19 | 25 | 31 | 37 | 43 | 49 | 55 | 61 |
| 2 | 25 | 37 | 49 | 61 | 73 | 85 | 97 | 109 |
| 4 | 37 | 61 | 85 | 109 | 133 | 157 | 181 | 205 |
| 6 | 49 | 85 | 121 | 157 | 193 | 229 | 265 | 301 |
| 8 | 61 | 109 | 157 | 205 | 253 | 301 | 349 | 397 |

UL LENGTH for I2R TB NDP

USER INFO SUBFIELDS FOR USE WITH RANGING NDPA PPDUS (NTB/DL NDP) 701

Figure 7

11AZ SOUNDING LSIG LENGTH CALCULATION METHOD AND APPARATUS

CROSS-REFERENCE TO RELATED APPLICATION AND PRIORITY CLAIM

This application claims the benefit of U.S. Provisional Patent Application No. 63/229,627 entitled "11AZ SOUNDING LENGTH CALCULATION" filed Aug. 5, 2021, which is incorporated by reference in its entirety as if fully set forth herein.

BACKGROUND

Field

The present disclosure is directed in general to communication networks. In one aspect, the present disclosure relates generally to wireless local area network (WLAN) implementing the Institute of Electrical and Electronics Engineers (IEEE) 802.11 standard and any other standards and/or networks that can exchange communications between wireless communication devices for measuring distances among the wireless communication devices.

Description of the Related Art

An ever-increasing number of relatively inexpensive, low power wireless data communication services, networks and devices have been made available over the past number of years, promising near wire speed transmission and reliability. Some wireless communication devices include a wireless local area network (WLAN) network interface and satellite positioning technology, such as global positioning system (GPS) technology. GPS technology in wireless communication devices is useful for navigating to a desired location, for example. However, GPS technology does not typically provide accurate location information when a GPS receiver is not in direct sight of a GPS satellite, and thus GPS technology is often not useful for providing location information while a wireless communication device is within a building such as an airport, a shopping mall, etc., or within a tunnel, etc.

Techniques for determining a position of a wireless communication device using WLAN technology have been provided in the area of wireless communications with various wireless technology standards—including for example, the IEEE Standards 802.11a/b/g, 802.11n, 802.11ac and 802.11ax and their updates and amendments, as well as the IEEE Standard 802.11az now in the process of being developed—which have been introduced and are known to persons skilled in the art and are collectively incorporated by reference as if set forth fully herein fully. Such positioning techniques may employ channel sounding measurement sequences which exchange data using null data packet (NDP) frames to determine a distance between first and second wireless communication devices by measuring a time of flight of NDP frames between the first and second wireless communication devices. In an example channel sounding measurement sequence, such as in the IEEE 802.11az Wi-Fi communications standard, a responder (e.g., access point device) may send a trigger frame to solicit uplink (UL) transmissions of sounding frames (e.g., null data packets) from initiators (e.g., station devices). However, since the frame format of trigger-based NDP frames is not yet defined for communications, initiators in sounding operations may not be able to respond to a trigger frame requesting an uplink transmission for use in channel sounding. As seen from the foregoing, existing solutions for providing wireless data communication services with accurate positioning information are extremely difficult at a practical level by virtue of the difficulty in providing a frame format for NDP frames used with channel sounding measurements that can be efficiently computed to reduce the overhead, processing, and timings costs required for determining the position of a wireless communication device.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A system, apparatus, and methodology are described for enabling wireless communication station (STA) devices to compute and signal UL-Length and L-SIG Length (LLEN) subfield values for use in trigger frame and response physical layer protocol data units (PPDUs) supported by emerging 802.11 standards, such as 802.11az, which use null data packets (NDP) to estimate the position of a station (STA) in a multipath environment. In selected embodiments, an access point/STA device generates a trigger frame which conveys control information (e.g., MCS, RU allocation, $N_{SS}$, UL-Length, $N_{LTF-REP}$, $N_{HE-LTF}$, STBC, etc.) to receiving STA devices, where the control information allocates resources for the STA devices and solicits, from the STA devices, one or more uplink high efficiency (HE) PPDU transmissions which include LLEN subfield values. On account of the inability to apply padding with NDP PPDUs that are supported by emerging 802.11az standards (since there is no data field with ranging NDP PPDUs), the encoded UL-Length subfield value is computed to be the exact value of the LLEN subfield value which specifies the number of data symbols to transmit on UL HE NDP PPDU transmissions (e.g., UL-Length=LLEN). As a result, a receiving STA device that decodes the control information from a received TF may be configured to copy the UL-Length information into the LLEN subfield of each UL HE PPDU transmission, thereby specifying the number of data symbols to transmit on UL HE PPDU transmission. To correctly encode the NDP trigger frames with the UL-Length=LLEN subfield value, the access point/STA device may be configured to compute the UL-Length=LLEN=10+y+$\Sigma_{i=1}^{NUM\_USERS}$($N_{LTF-REP}$(i)+1)*$N_{HE-LTF}$(i)*6, where y=0 (for I2R/R2I non-trigger-based NDP PPDU transmissions), where y=3 (for I2R/R2I trigger-based NDP PPDU transmissions), where f$N_{LTF-REP}$ is the number of HE-LTF repetitions, and where $N_{HE-LTF}$ is the number of HE-LTF symbols which meets or exceeds the total spatial streams among users (NSTS). In other embodiments, the access point/STA device may be configured to encode the NDP trigger frames with the UL-Length=LLEN subfield value by using a first lookup table of LLEN subfield values which are accessed as a function of $N_{LTF-REP}$ and $N_{HE-LTF}$ values for I2R/R2I non-trigger-based NDP PPDU transmissions. In addition or in the alternative, the access point/STA device may be configured to encode the NDP trigger frames with the UL-Length=LLEN subfield value by using a second lookup table of UL-Length subfield values which are accessed as a function of $N_{LTF-REP}$ and $N_{HE-LTF}$ values for I2R trigger-based NDP PPDU transmissions.

Figure 1:
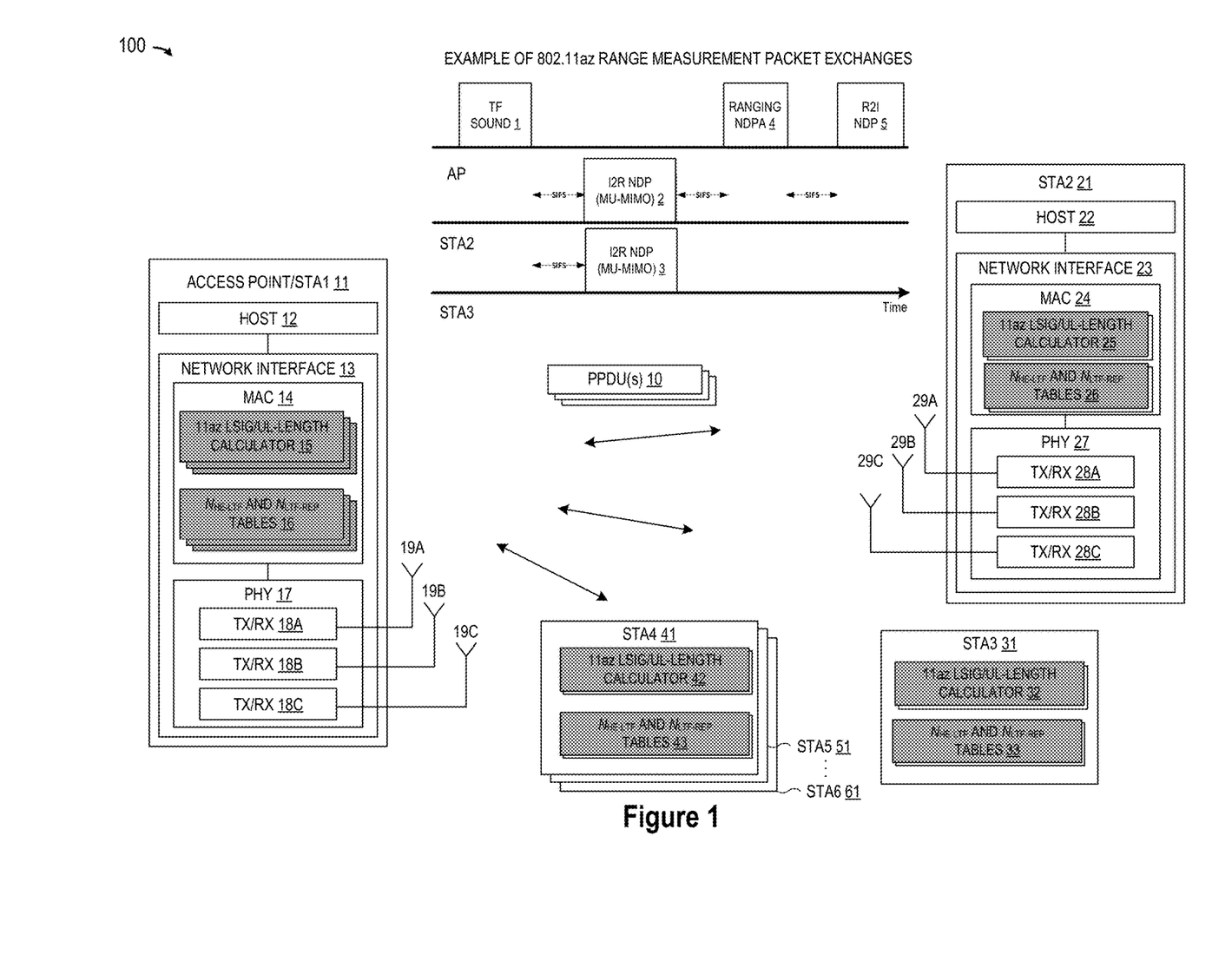
FIG. 1 is a block diagram of a wireless local area network (WLAN) in which wireless communication station (STA) devices exchange packets for use in calculating 802.11az positioning information in accordance with selected embodiments of the present disclosure.

To provide a contextual understanding for selected embodiments of the present disclosure, reference is now made to FIG. 1 which shows a block diagram of a wireless local area network (WLAN) 100 in which an access point (AP) station (STA) 11 and one or more wireless communication STA devices 21, 31, 41, 51, 61 transmit and receive data frame packets 10 for use in calculating 802.11az positioning information. As depicted, the AP 11 includes a host processor 12 coupled to a network interface 13. In selected embodiments, the network interface 13 includes one or more integrated circuits (IC) devices configured to operate a local area network (LAN) protocol. To this end, the network interface 13 may include a medium access control (MAC) processor 14 and a physical layer (PHY) processor 17. In selected embodiments, the MAC processor 14 is implemented as an 802.11az MAC processor 14, and the PHY processor 17 is implemented as an 802.11az PHY processor 17. The PHY processor 17 includes a plurality of transceivers 18 which are coupled to a plurality of antennas 19. Although three transceivers 18A-C and three antennas 19A-C are illustrated, the AP 11 may use any suitable number of transceivers 18 and antennas 19 in other embodiments. In addition, the AP 11 may have more antennas 19 than transceivers 18, in which case antenna switching techniques are used to switch the antennas 19 between the transceivers 18. In selected embodiments, the MAC processor 14 is implemented with one or more integrated circuit (IC) devices, and the PHY processor 17 is implemented on one or more additional IC devices. In other embodiments, at least a portion of the MAC processor 14 and at least a portion of the PHY processor 17 are implemented on a single IC device. In various embodiments, the MAC processor 14 and the PHY processor 17 are configured to operate according to at least a first communication protocol (e.g., 802.11az). In other embodiments, the MAC processor 14 and the PHY processor 17 are also configured to operate according to one or more additional communication protocols (e.g., according to the IEEE 802.11be Standard). Using the communication protocol(s), the AP device 11 is operative to create a wireless local area network (WLAN) 100 in which one or more client stations (e.g., 21) may communicate with the AP 11 and/or with other client stations (e.g., 31, 41) located within the WLAN 100. Although six client stations 21, 31, 41, 51, 61 are illustrated in FIG. 1, the WLAN 100 may include any suitable number of client stations in various scenarios and embodiments.

At least one of the client stations (e.g., client station 21) is configured to operate at least according to the first communication protocol. To this end, the client station 21 includes a host processor 22 coupled to a network interface 23. In selected embodiments, the network interface 23 includes one or more IC devices configured to operate as discussed below. For example, the depicted network interface 23 may include a MAC processor 24 and a PHY processor 27. In selected embodiments, the MAC processor 24 is implemented as an 802.11az MAC processor 24, and the PHY processor 27 is implemented as an 802.11az PHY processor 27. The PHY processor 27 includes a plurality of transceivers 28 coupled to a plurality of antennas 29. Although three transceivers 28A-C and three antennas 29A-C are illustrated, the client station 21 may include any suitable number of transceivers 28 and antennas 29. In addition, the client station 21 may include more antennas 29 than transceivers 28, in which case antenna switching techniques are used. In selected embodiments, the MAC processor 24 is implemented on at least a first IC device, and the PHY processor 27 is implemented on at least a second IC device. In other embodiment, at least a portion of the MAC processor 24 and at least a portion of the PHY processor 27 are implemented on a single IC device. As will be appreciated, one or both of the client stations 31, 41 may have a structure that is the same as or similar to the client station 21, though there can be structural differences.

As disclosed herein, the wireless access point (AP) station (STA1) 11 transmits data streams to one or more client stations 21, 31, 41, 51, 61 in the WLAN 100. The AP 11 is configured to operate with client stations (e.g., 21) according to at least a first communication protocol which may be referred to as the next generation positioning (NGP) communication protocol or IEEE 802.11az communication protocol. In some embodiments, different client stations in the vicinity of the AP 11 are configured to operate according to one or more other communication protocols which define operation in some of the same frequency band(s) as the NGP communication protocol but with generally lower data throughputs. Such lower data throughput communication protocols (e.g., IEEE 802.11a, IEEE 802.11n, IEEE 802.11ac and/or 802.11ax) are collectively referred herein as "legacy" communication protocols.

In the context of the present disclosure, it will be understood by those skilled in the art that the IEEE 802.11 standard (a.k.a., Wi-Fi) has been amended to provide very high data throughput performance in real-world, high density scenarios. For example, there are advanced medium access control layer (MAC) and physical layer (PHY) techniques being addressed in IEEE 802.11az standard which provide for the exchange of range measurement PPDUs 10 to enable determination of absolute and relative position of the STAs 11, 21, 31, 41, 51, 61 with better accuracy. In the illustrated example, the 802.11az range measurement packet exchange includes an AP-initiated ranging measurement exchange, though trigger-based ranging measurement exchanges between two peer communication devices can initiated by one of the peer communication devices. As depicted, a first communication device (e.g., the AP 11) transmits a DL PPDU 1 that includes a trigger frame (TF) to cause a group of multiple second communication devices (e.g., STA2, STA3) to simultaneously transmit uplink (UL) multi-user (MU) PPDUs 2, 3 which convey NDPs from the second communication devices (e.g., STA2, STA3). In selected embodiments, the second communication devices are configured to generate UL MU PPDUs 2, 3 which provide ranging NDPs having a format and/or including signals that is/are particular to a ranging measurement procedure. In response to the ranging NDP PPDUs 2, 3, the first communication device (e.g., AP 11) transmits a DL PPDU 4 that includes an NDP announcement (NDPA) frame at a defined time period after an end of the UL ranging NDP PPDUs 2, 3, followed by an additional PPDU 5 that transmits a DL NDP frame, where either or both of the NDPA frame in the PPDU 4 and the NDP frame in the PPDU 5 may include parameters for the second communication devices to use when participating in the ranging measurement exchange.

As disclosed herein, the trigger frame conveyed in the DL PPDU 1 may be configured as a specific type of trigger frame sounding packet for initiating a trigger-based ranging measurement exchange. For example, reference is now made to FIG. 2 which depicts a format of an 802.11az trigger frame 201 which includes a "Frame Control" field, a "Duration" field, a "Receive Address" (RA) field, a "Transmitter Address" (TA) field, a "Common Information" field, one or more "User Information" fields, a "Padding" field, and a "Frame Check Sequence" (FCS) field. The "Frame Control" field identifies at least the protocol version, type and subtype for the frame. The "Duration" field is set to the remaining duration of the transmit operation. The RA field is the address of the recipient STA. The TA field is the address of the STA transmitting the Trigger frame. The "Common Info" field may include a number of subfields conveying information that is shared in common by the trigger frame 201. The "User Information" field(s) may include a number of subfields which convey information identifying the users or receiving STA devices that are intended recipients of the trigger frame 201. The "Padding" field extends the frame length to give the recipient STAs more time to prepare a response. And the FCS field includes error detection information for use by a recipient of the frame to determine if any of the fields of the trigger frame were received in error.

Figure 2:
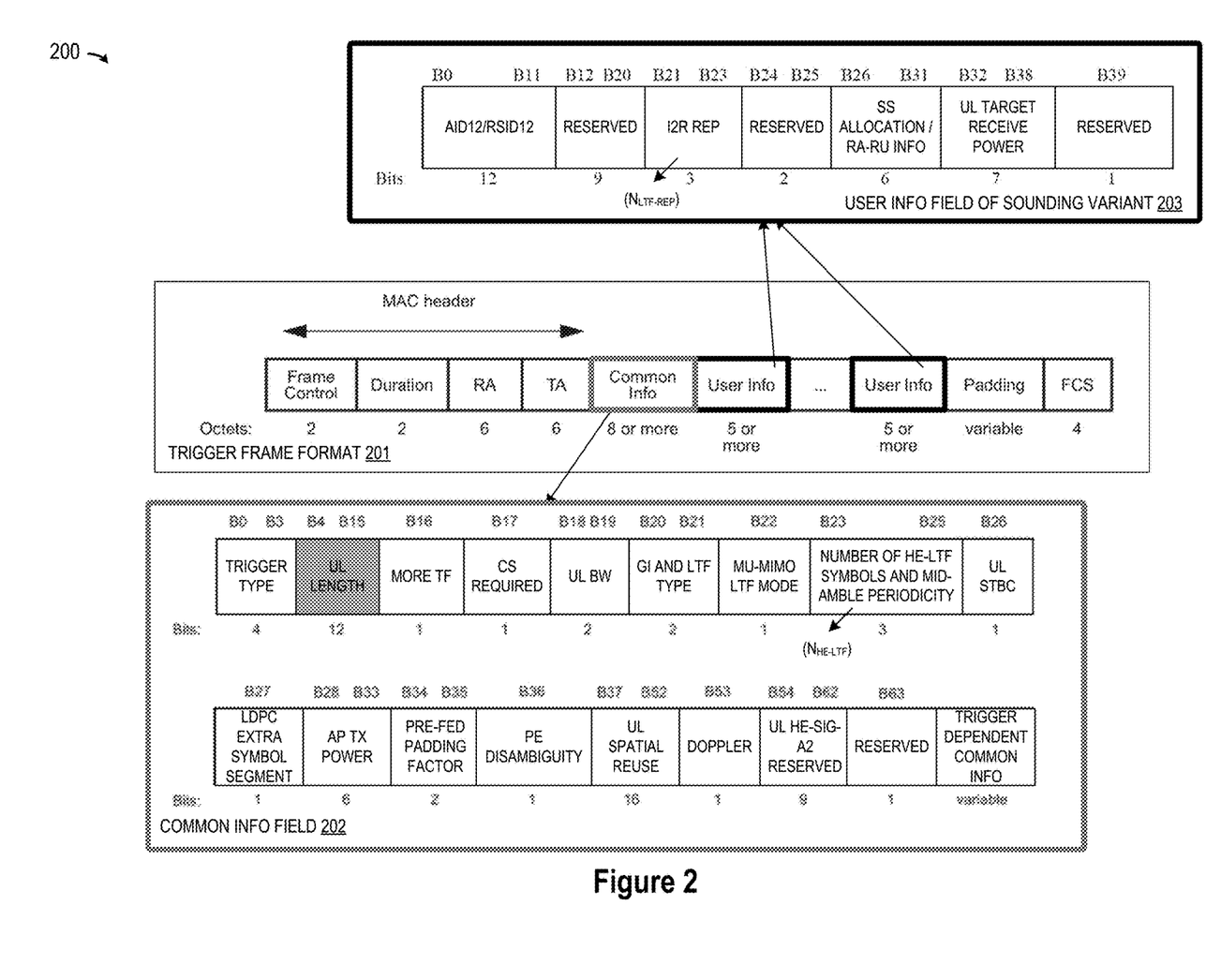
FIG. 2 is a format of a trigger frame with detailed depiction of common information and user information fields in accordance with selected embodiments of the present disclosure.

As depicted, the "Common Info Field" 202 includes a plurality of specified subfields, including a "Trigger Type" subfield, "UL-Length" subfield, "More TF" subfield, "CS Required" subfield, "UL BW" subfield, "GI and LTF Type" subfield, "MU-MIMO LTF Mode" subfield, "Number of HE-LTF Symbols and Midamble Periodicity" subfield, and "UL STBC" subfield. While the functional description of the Common Info subfields is defined in the 802.11az standard, of particular relevance to the present disclosure is the "UL-Length" subfield which indicates the value of the L-SIG Length field of the uplink PPDU that is being solicited in response to the Trigger frame. In addition, the "Number of HE-LTF Symbols and Midamble Periodicity" subfield specifies the number of HE-LTF symbols ($N_{HE\text{-}LTF}$) which depends on the number of space-time streams as specified in Table 1 below:

TABLE 1

| TOTAL SS | $N_{HE\text{-}LTF}$ |
|---|---|
| 1 | 2 |
| 2 | 3 |
| 3 | 4 |
| 4 | 4 |
| 5 | 6 |
| 6 | 6 |
| 7 | 8 |
| 8 | 8 |

As depicted, the "User Info Field of Sounding Variant" 203 includes a plurality of specified subfields, including an "AID12/RSID12" subfield, "I2R Rep" subfield, "SS allocation/RA-RU Information" subfield, "UL Target Receive Power" subfield, and one or more "Reserved" subfields. Though the depicted "User Info Field of Sounding Variant" 203 may be implemented for a non-secure sounding subvariant, it will be appreciated that a User Info Field for a Secure Sounding Subvariant may also be used which includes the same subfields along with an additional "Trigger Dependent User Info" subfield for carrying a Sequence Authentication Code (SAC) field to provide authentication information. While the functional description of the User Information subfields is defined in the 802.11az standard, of particular relevance to the present disclosure is the "I2R Rep" subfield which indicates the number of HE-LTF repetitions ($N_{LTF\text{-}REP}$). For example, the $N_{LTF\text{-}REP}$ may be computed as $N_{LTF\text{-}REP}$=I2R Rep+1.

Referring back to FIG. 1, each of the second communication devices (e.g., STA2, STA3) may respond to the trigger frame sounding packet in the DL PPDU 1 by simultaneously transmitting the initiator to respondent (I2R) NDP PPDUs 2, 3 at a defined time period after an end of the DL PPDU 1. In selected embodiments, the defined time period is a short interframe space (SIFS) as defined by the IEEE 802.11 Standard. In other embodiments, another suitable time period is utilized. While two STAs (e.g., STA2, STA3) are depicted as transmitting the I2R NDP PPDUs 2, 3 as UL multi-user (MU) multiple input, multiple output (MIMO) transmissions, it will be appreciated that additional or fewer other STA devices may transmit I2R NDP PPDUs using the same uplink frequency band by allocating different spatial stream(s) to each STA device (e.g., MU-MIMO). In other embodiments, the I2R NDP PPDUs 2, 3 may be transmitted using UL orthogonal frequency division multiple access (OFDMA) transmission having two or more NDPs from multiple second communication devices, e.g., STA2, STA3, and STA4, in different respective frequency bandwidth portions. In other embodiments, three or more I2R NDP PPDUs may be transmitted using a combination of UL MU-MIMO and UL OFDMA, where at least two I2R NDPs are transmitted using MU-MIMO in a same frequency bandwidth portion via different spatial streams, and at least one I2R NDP is transmitted in at least one other different frequency bandwidth portion.

However transmitted, the I2R NDP PPDUs 2, 3 may be configured to provide ranging NDPs having a format and/or including signals that is/are particular to a ranging measurement procedure. As a result, the configured ranging NDPs 2, 3 may have a format that is different than NDPs that are used for purposes other than ranging measurements, and/or may include signals that are different than NDPs that are used for purposes other than ranging measurements, such as NDPs used in connection with performing channel measurements, NDPs used in connection with performing beamforming measurements, etc. Examples of ranging NDP PPDUs may include high efficiency (HE) single user (SU) PPDUs and null data packet (NDP) PPDUs that may be trigger-based (TB) or non-trigger-based (NTB). Upon transmitting the I2R NDP PPDUs 2, 3, each second communication device (e.g., STA2) records a time $t_{1,k}$ at which the second communication device began transmitting a particular portion of the I2R NDP PPDU (e.g., a particular HE-LTF in the I2R NDP 2), where k is an index indicating the particular second communication device. Similarly, when the first communication device (e.g., AP 11) receives each I2R NDP, the first communication device records a time $t_{2,k}$ at which the first communication device began receiving the particular portion of the I2R NDP PPDU (e.g., the particular HE-LTF in the I2R NDP 2).

In response to the I2R NDP PPDUs 2, 3, the first communication device (e.g., AP 11) begins transmitting a DL PPDU 4 that includes an NDPA frame at a defined time period after an end of the I2R NDP PPDUs 2, 3. In selected embodiments, the defined time period is SIFS, but any suitable time period may be used. The NDPA frame within DL PPDU 4 is configured to cause the second communication devices to be prepared to receive an respondent to initiator (R2I) NDP PPDU 5 from the first communication device as part of a ranging measurement procedure. As will be appreciated by those skilled in the art, either or both of the NDPA frame in the PPDU 4 and the R2I NDP frame in the PPDU 5 may include parameters for the second communication devices to use when participating in the ranging measurement exchange. Upon transmitting the R2I NDP PPDU 5, the first communication device (e.g., AP) records a time $t_3$ when the first communication device began transmitting the R2I NDP PPDU 5. Similarly, when each second communication device (e.g., STA2) receives the R2I NDP PPDU 5, the second communication device records a time $t_{4,k}$ at which the second communication device began receiving the R2I NDP PPDU 5. Once collected and assembled, any suitable technique, including currently known techniques, may be utilized to calculate a time-of-flight using the recorded times $t_{1,k}$, $t_{2,k}$, $t_3$, and $t_{4,k}$. Respective distances between the first communication device and the second communication devices may be calculated using the calculated times-of-flight (e.g., by respectively multiplying the times-of-flight by the speed of light).

In compliance with existing 802.11 wireless encoding schemes, the trigger frame 1, I2R NDPs 2-3, NDPA 4, and R2I NDP 5 are each conveyed in a PPDU data structure that includes at least a PHY preamble having one or more short training fields (STFs), one or more long training fields (LTFs) and one or more signal fields. In selected embodiments, each PHY preamble of each NDP PPDU includes i) a legacy portion having a legacy STF (L-STF), a legacy LTF (L-LTF), and a legacy signal field (L-SIG), and ii) a non-legacy portion having a high efficiency WiFi STF (HE-STF), a high efficiency WiFi signal field (HE-SIG), and one or more high efficiency WiFi LTFs (HE-LTFs). As will be appreciated, each NDP PPDU does not include a PHY data portion.

Figure 3:
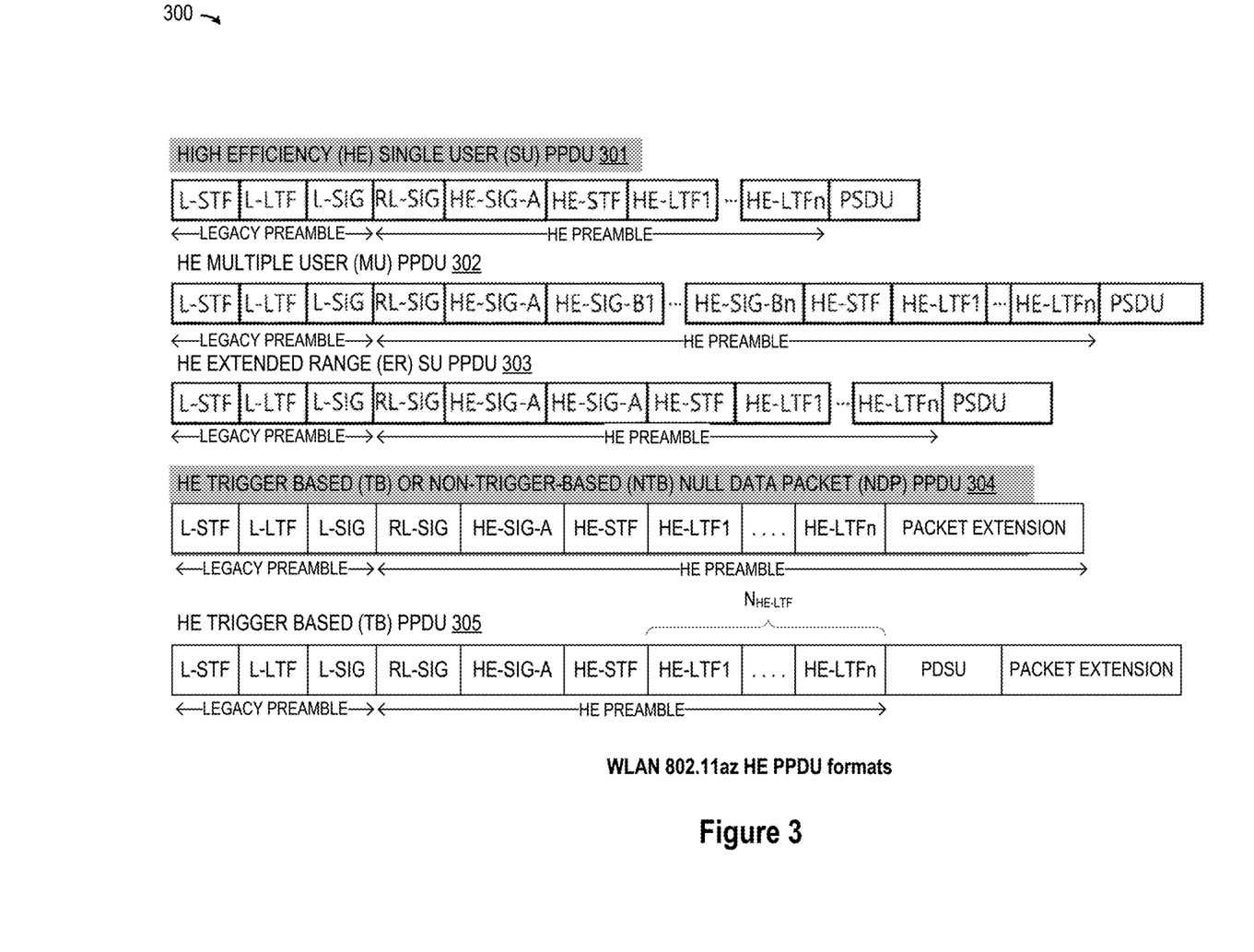
FIG. 3 is a diagrammatic illustration of various formats for WLAN 802.11az high efficiency (HE) PPDU frames.

To provide additional details for an improved understanding of selected embodiments of the present disclosure, reference is now made to FIG. 3 which illustrates an example set 300 WLAN 802.11az high efficiency (HE) PPDU data structures 301-305. As depicted, the PPDU data structures 300 include an HE single user (SU) PPDU 301, a HE multi-user (MU) PPDU 302, an extended range (ER) SU PPDU 303, a null data packet (NDP) PPDU 304 that may be trigger-based (TB) or non-trigger-based (NTB), and an HE TB PPDU 305. Each of the PPDU data structures 301-305 includes a common legacy preamble portion with a Legacy Short Training field (L-STF), Legacy Long Training field (L-LTF), Legacy SIGNAL field (L-SIG). In addition, the PPDU data structures 301-305 include an HE preamble portion with a Repeated Legacy SIGNAL field (RL-SIG), one or more HE Signal A fields (HE-SIG-A) and/or HE Signal B fields (HE-SIG-B), an HE Short Training field (HE STF), one or more HE Long Training fields (HE-LTF) and an optional Data field. The Data field may include a Physical layer service data unit (PSDU). However, in selected PPDU data structures (e.g., HE SU PPPU 301, HE NDP PPDU 304), there is no Data/PSDU field included.

In each of the PPDU data structures 301-305, the L-SIG field is used to communicate rate and length information for the PPDU data structure, where the L-SIG field includes a LENGTH field (LLEN) and a RATE field. Under the 802.11ax standard, the LLEN field is computed using the equation, LLEN=[(TXTIME−SignalExtension−20)/4]*3−3−m, where TXTIME is the maximum packet duration time, where SignalExtension may be a time set to a 0-10 μsec based on the PPDU format, where m=1 for HE MU PPDU and HE ER SU PPDU, and where m=2 otherwise. In the case of NDP PPDU data structures, SignalExtension=0 since there is no data field. Unfortunately, the TXTIME parameter is not fully defined in the 802.11ax standard for trigger-based null data packet PPDU data structures which can lead to the NDP PPDU erroneously being interpreted as a data packet.

To understand the limitations of the existing approach for determining the L-SIG Length (LLEN) value, set forth below is the 802.11ax standard's definition of the TXTIME parameter:

TXTIME=20+$T_{HE-PREAMBLE}$+$N_{SYM}T_{SYM}$+$N_{MA}N_{HE-LTF}$ $T_{HE-LTF-SYM}$+$T_{PE}$+SignalExtension, where $T_{HE-PREAMBLE}$ is the duration of the HE-PREAMBLE, $N_{SYM}$ is the number of data symbols, $T_{SYM}$ is the duration of each data symbol, $N_{MA}$ is the number of midambles, $N_{HE-LTF}$ is the number of HE-LTF symbols, $T_{HE-LTF-SYM}$ is the duration of each HE-LTF symbol, and $T_{PE}$ is the duration of the packet extension.

In computing the TXTIME parameter, the 802.11ax standard also sets forth the following computational equations for $T_{HE-PREAMBLE}$ for HE-TB PPDU data structures:

$$T_{HE-PREAMBLE}=T_{RL-SIG}+T_{HE-SIGA}+T_{HE-STF-T}+N_{HE-LTF}+T_{HE-LTF-SYM},$$

where $T_{RL-SIG}$ is the duration of the RL-SIG field, $T_{HE-SIGA}$ is the duration of the HE-SIGA field, $T_{HE-STF-T}$ is the duration of the HE-STF-T field, $N_{HE-LTF}$ is the number of HE-LTF symbols, and $T_{HE-LTF-SYM}$ is the duration of each HE-LTF symbol.

In addition, the 802.11ax standard also sets forth the following computational equations for $T_{HE-PREAMBLE}$ for HE-SU PPDU data structures:

$$T_{HE-PREAMBLE}=T_{RL-SIG}+T_{HE-SIGA}+T_{HE-STF-NT}+N_{HE-LTF}+T_{HE-LTF-SYM},$$

where $T_{RL-SIG}$ is the duration of the RL-SIG field, $T_{HE-SIGA}$ is the duration of the HE-SIGA field, $T_{HE-STF-NT}$ is the duration of the HE-STF-NT field, $N_{HE-LTF}$ is the number of HE-LTF symbols, and $T_{HE-LTF-SYM}$ is the duration of each HE-LTF symbol.

In accordance with the 802.11ax standard, the computation of the $T_{HE-PREAMBLE}$ is simplified for NDP packets with the following specified equation component values: $T_{RL-SIG}$=4 μsec, $T_{HE-SIGA}$=8 μsec, $T_{HE-STF-T}$=8 μsec, $T_{HE-STF-NT}=4$ μsec. However, the 802.11ax standard does not specify the $T_{HE-PREAMBLE}$ equation component values $N_{HE-LTF}$ and $T_{HE-LTF-SYM}$.

As seen from the foregoing, the computation of the L-SIG LENGTH (LLEN) is computationally complex and uncertain, given the unspecified TXTIME parameter values for NDP PPDU packets.

To illustrate the problem that this uncertainty creates, reference is now made back to FIG. 1 to illustrate how the PPDU data structures are configured by the communication device that is generating and sending the PPDU. For example, the first communication device (e.g., AP/STA 11) which generates the trigger frame sounding packet in PPDU 1 fills out the UL-Length subfield of the Common Info field in the TF. In response to receiving the trigger frame sounding packet, the second communication device (e.g., STA2) is configured to copy the received UL-Length subfield value into the LLEN subfield of the L-SIG field for the response PPDU. In accordance with MU-MIMO and OFDMA signaling schemes of previous 802.11 standards, the first communication device would choose the UL-Length value for the trigger frame which accommodates the longest packet, in which case the second communication device would apply padding to their MPDU in order to comply with the copied UL-Length value.

While the padding solution may have worked with previous 802.11 standards, the trigger frame range sounding algorithm emerging in the 802.11az standard imposes more restrictions on the configuration of the UL-Length setting since HE trigger-based NDP PPDUs do not have a data field, thereby preventing the STA devices from applying padding. As a result, the UL-LEN subfield value set in the trigger frame needs to be set to the exact value of LSIG length (LLEN) subfield of the HE TB NDP, thereby eliminating any need to apply padding at the receiving/responding STA device(s).

To address these shortcomings from conventional solutions and others known to those skilled in the art, there is disclosed herein a system, apparatus, and method for correctly computing the UL-Length value which is set to the exact value of the LLEN value based on the $N_{HE-LTF}$ and $N_{LTF-REP}$ values given in the Common Info and User Info fields of the trigger frame. In selected embodiments, the access point/STA device is configured to correctly encode the trigger frames by computing the UL-Length=LLEN subfield value=$10+x+6*\Sigma_{i=1}^{NUM\_USERS}((N_{LTF-REP}(i)+1)*N_{HE-LTF}(i))$, where x=0 (for I2R/R2I non-trigger-based NDP PPDU transmissions), where x=3 (for I2R/R2I trigger-based NDP PPDU transmissions), where $N_{LTF-REP}$ is the number of HE-LTF repetitions, and where $N_{HE-LTF}$ is the number of HE-LTF symbols which meets or exceeds the total spatial streams among users (NSTS). In other embodiments, the access point/STA device may be configured to encode the trigger frame with the UL-Length=LLEN subfield value by using a first lookup table of LLEN subfield values which are accessed as a function of $N_{LTF-REP}$ and $N_{HE-LTF}$ values for I2R/R2I non-trigger-based NDP PPDU transmissions. In addition or in the alternative, the access point/STA device may be configured to encode the trigger frame with the UL-Length=LLEN subfield value by using a second lookup table of UL-Length subfield values which are accessed as a function of $N_{LTF-REP}$ and $N_{HE-LTF}$ values for I2R trigger-based NDP PPDU transmissions.

To illustrate the derivation of the computational equation for the UL-Length subfield value for 802.11az TB AND NTB NDP packets, the TXTIME equation component is first simplified using the following specified 802.11az NDP parameter values ($N_{SYM}=0$, $N_{MA}=0$, $T_{PE}=4$ μsec, and $T_{HE-LTF-SYM}=8$ μsec) and incorporating the $N_{LTF-REP}$ repetition value. As a result, a simplified TXTIME parameter may be derived as follows:

$$\begin{aligned}
TXTIME &= 20 + T_{HE-PREAMBLE} + N_{SYM}T_{SYM} + \\
&\quad N_{MA}N_{HE-LTF}T_{HE-LTF-SYM} + T_{PE} + SignalExtension \\
&= 20 + T_{HE-PREAMBLE} + \sum_{i=1}^{NUM\_USERS} N_{LTF-REP}(i) * \\
&\quad N_{HE-LTF}(i) * T_{HE-LTF-SYM} + T_{PE} + \text{Signal Extension} \\
&= 40 + x + \sum_{i=1}^{NUM\_USERS} \left(N_{LTF-REP}(i) * N_{HE-LTF}(i) * 8\right)
\end{aligned}$$

where x=0 for NTB I2R/R2I NDP and TB R2I NDP PPDUs, and where x=4 for TB-I2R NDP PPDUs. As depicted with the "i" values of the TXTIME equation, each of the "i" users (or STA devices) may have its own, different values for the number of HE-LTF symbols (e.g., $N_{LTF-REP}(i)$) and number of repetitions (e.g., $N_{HE-LTF}(i)$).

Once the simplified TXTIME parameter is substituted in the equation for the UL-Length value for 802.11az NDP trigger frame sounding packets, the UL-Length value may be derived as follows:

$$\begin{aligned}
UL\text{-Length} &= [(TXTIME - SignalExtension - 20)/4]*3 - 3 - m \\
&= [(TXTIME - 20)/4]*3 - 3 - m \\
&= \left[\left(\left(40 + x + \sum_{i=1}^{NUM\_USERS}(N_{LTF-REP}(i)+1)\right.\right.\right. \\
&\quad \left.\left.\left.*_{NHE-LTF}(i)*8\right) - 20\right)/4\right]*3 - 3 - m \\
&= 10 + y + 6 * \sum_{i=1}^{NUM\_USERS}\left((N_{LTF-REP}(i)+1)*N_{HE-LTF}(i)\right)
\end{aligned}$$

where y=0 for NTB I2R/R2I NDP and TB R2I NDP PPDUs, and where y=3 for TB-I2R NDP PPDUs. In this computation, the values of $N_{HE-LTF}(i)$ are derived based on total spatial streams among users as shown above in Table 1. For HE Ranging NDP PPDUs, the total number of spatial streams (Total SS) is N_STS, and for HE TB Ranging NDP PPDUs, the total number of spatial streams (Total SS) is the sum of allocated N_STS of all STAs in Trigger Frame. In this way, the UL Length subfield of a Trigger frame is computed as UL-Length=$10+y+6*\Sigma_{i=1}^{NUM\_USERS}((N_{LTF-REP}(i)+1)*N_{HE-LTF}(i))$ based on the simplified TXTIME parameter. In case of Sounding Ranging trigger frames, the resulting UL-Length value is equivalent to $13+6*\Sigma_{i=1}^{NUM\_USERS}((N_{LTF-REP}(i)+1)*N_{HE-LTF}(i))$, where $N_{LTF-REP}(i)$ is the number of HE-LTF repetitions for STAi (given by the I2R Rep subfield value plus 1) and where $N_{HE-LTF}(i)$ is the number of HE-LTF symbols for STAi.

In similar fashion, the simplified TXTIME parameter may be substituted in the equation for the L-SIG Length (LLEN) value for 802.11az UL and DL NDP packets to compute LLEN. As a result, both of the computed UL-Length and LLEN values have the same value set forth in Equation 1:

UL-Length=LLEN=$10+y+6*\Sigma_{i=1}^{NUM\_USERS}$
$((N_{LTF-REP}(i)+1)*N_{HE-LTF}(i))$, where y=0 for NTB I2R/R2I NDP and TB R2I NDP PPDUs, and where y=3 for TB-I2R NDP PPDUs.

As disclosed herein, each STA device may include a host processor and/or MAC processor which is configured to compute the UL-Length and/or LLEN fields for 802.11az sounding NDP packets based on the Equation 1. As an alternative to using a processor to calculate the symbol count values UL-Length and LLEN from Equation 1, each STA device may include a pre-computed lookup table of UL- Length or LLEN subfield values which are accessed as a function of the $N_{LTF-REP}$ and $N_{HE-LTF}$ values for I2R/R2I non-trigger-based NDP PPDU transmissions.

Figure 4:
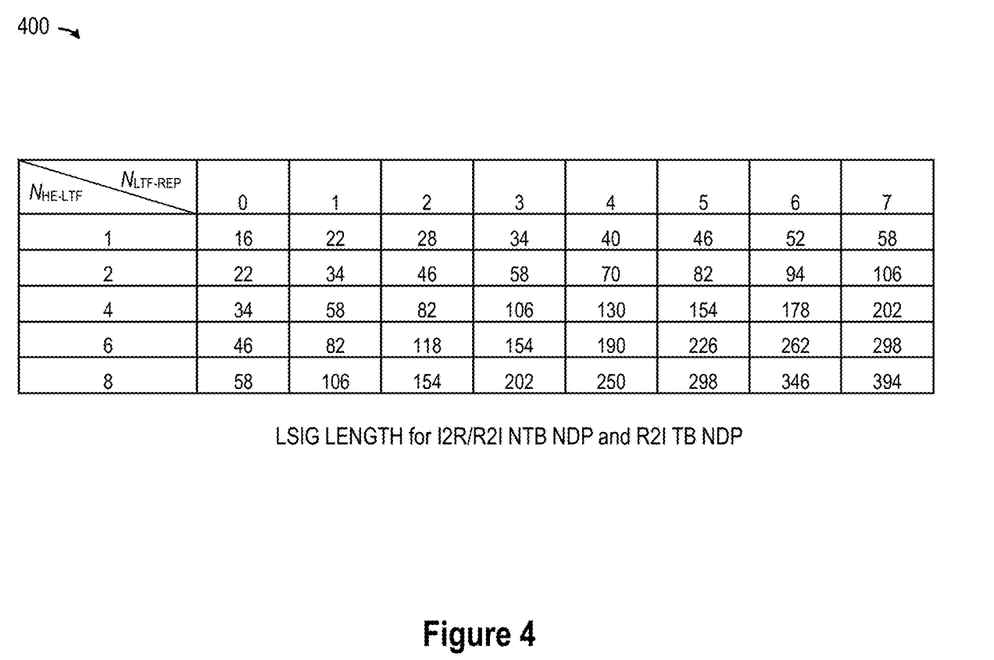
FIG. 4 illustrates an example table listing of LSIG length values calculated from different $N_{HE-LTF}$ and $N_{LTF-REP}$ values for use with I2R/R2I non-trigger-based NDP frames and R2I trigger-based NDP frames in accordance with selected embodiments of the present disclosure.

To provide additional details for an improved understanding of selected embodiments of the present disclosure, reference is now made to FIG. 4 which is an example table 400 which lists L-SIG Length values (LLEN) calculated from different $N_{HE-LTF}$ and $N_{LTF}$-REP values. In the table 400, $N_{LTF-REP}=0$ means there is no repetition. In generating the table 400, the L-SIG Length values are computed for use with I2R/R2I non-trigger-based NDP frames and R2I trigger-based NDP frames for a given $N_{HE-LTF}$ symbols and Number of repetitions $N_{LTF-REP}$ by using the equation LLEN=10+$\Sigma_{i=1}^{NUM\_USERS}(N_{LTF-REP}(i)+1)*N_{HE-LTF}(i)*6$, which in turn is derived from the computation of TXTIME=40+$\Sigma_{i=1}^{NUM\_USERS}(N_{LTF-REP}(i)+1)*N_{HE-LTF}(i)*8$. As a result, the table 400 lists LLEN values (e.g., 22) which may be accessed from corresponding values for $N_{HE-LTF}$ (e.g., 2) and $N_{LTF-REP}$ (e.g., 0).

Figure 5:
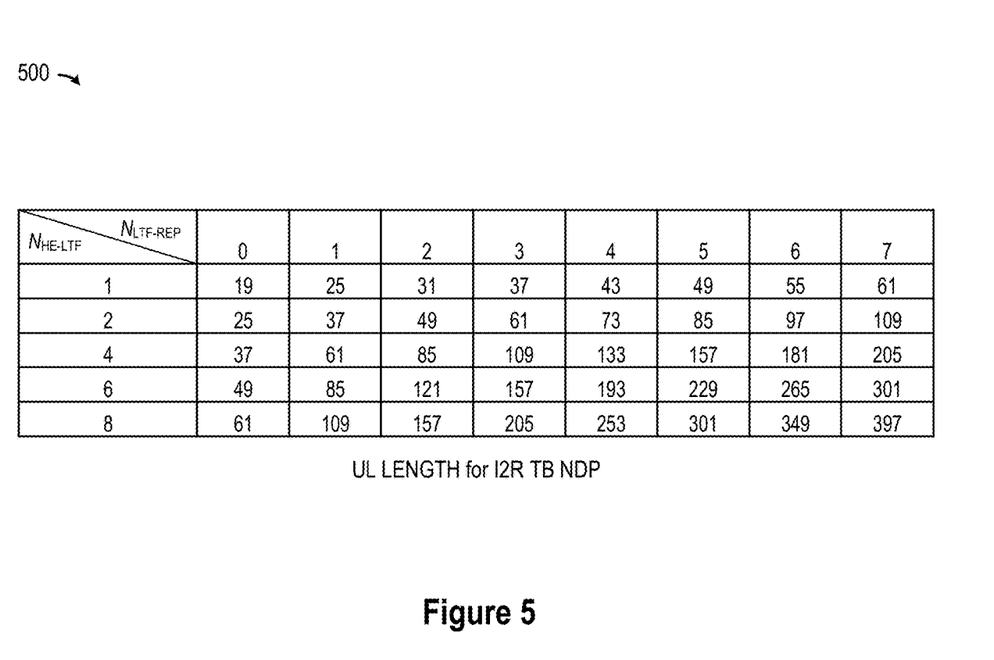
FIG. 5 illustrates an example table listing of UL length values calculated from different $N_{HE-LTF}$ and $N_{LTF-REP}$ values for use with I2R trigger-based NDP frames in accordance with selected embodiments of the present disclosure.

To provide additional details for an improved understanding of selected embodiments of the present disclosure, reference is now made to FIG. 5 which is an example table 500 which lists UL length values calculated from different $N_{HE-LTF}$ and $N_{LTF-REP}$ values. In generating the table 500, the UL length values are computed for use with I2R trigger-based NDP frames for a given $N_{HE-LTF}$ symbols and Number of repetitions $N_{LTF-REP}$ by using the equation LLEN=13+$(N_{LTF-REP}(i)+1)*N_{HE-LTF}(i)*6$, which in turn is derived from the computation of TXTIME=44+$(N_{LTF-REP}+1)*N_{HE-LTF}*8$. As a result, the table 500 lists UL-Length values (e.g., 25) which may be accessed from corresponding values for $N_{HE-LTF}$ (e.g., 2) and $N_{LTF-REP}$ (e.g., 0).

Figure 6A:
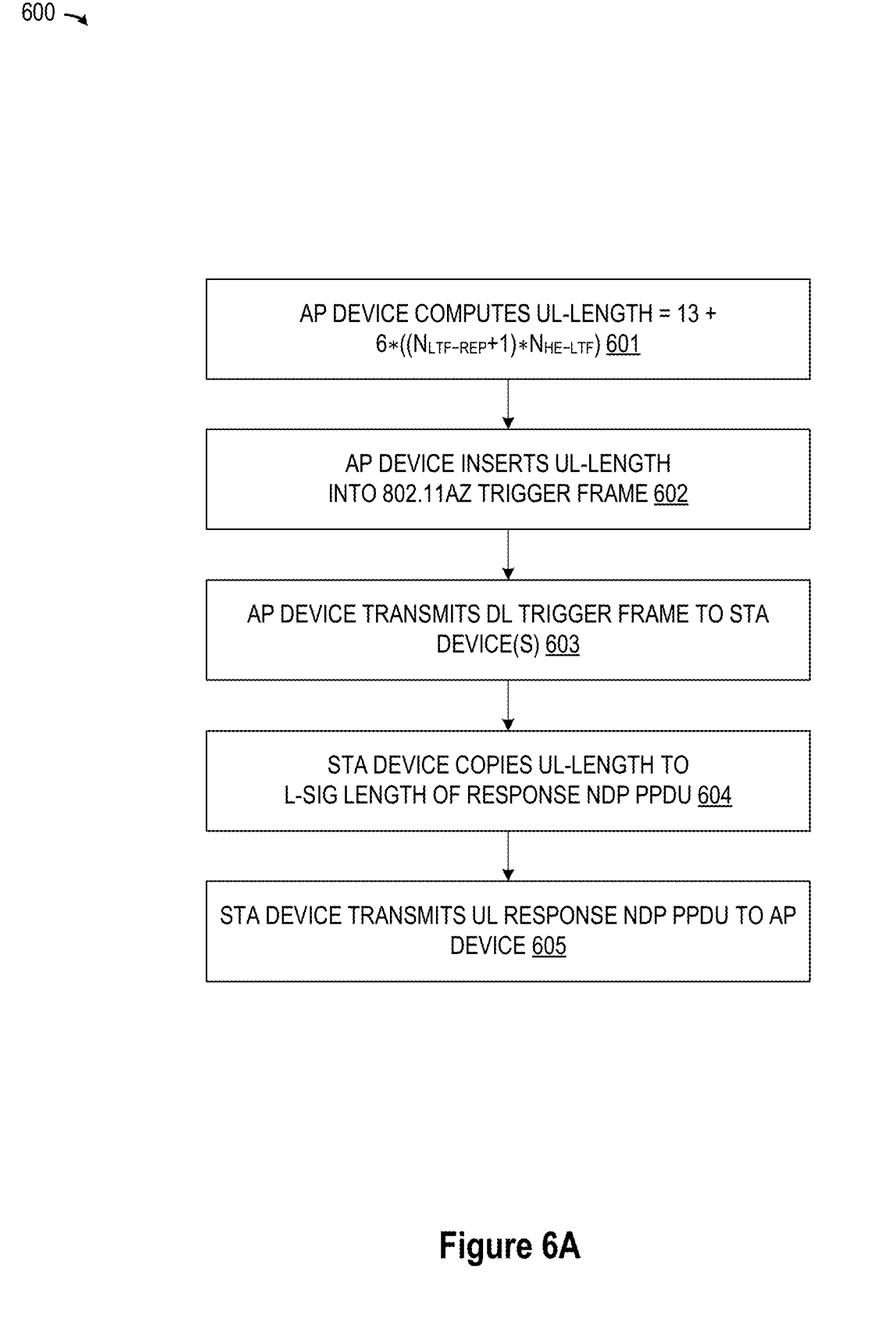
FIG. 6A depicts an exemplary logic flow diagram illustrating a processing sequence for using a UL Length value in a trigger-based protocol (multi-user) for a measurement sounding process in accordance with selected embodiments of the present disclosure.

To provide additional details for an improved understanding of selected embodiments of the present disclosure, reference is now made to FIG. 6A which depicts an exemplary logic flow diagram 600 to illustrate a processing sequence for computing and using a UL Length value in a trigger-based protocol (multi-user) for a measurement sounding process during a ranging measurement procedure. As disclosed herein, the network interface devices (e.g., 13, 23) may be configured to implement the method 600. In other embodiments, the method 600 is implemented by another suitable communication device. However implemented, the depicted logic flow and processing sequence are used by AP and STA devices to compute matching UL-Length and LLEN values from the specified number of symbols ($N_{HE-LTF}$) and number of repetitions ($N_{LTF-REP}$) for use with range sounding algorithms included in the 802.11az standard.

At step 601, an AP device performs an initial computation of the UL-Length value for a null data packet trigger frame based on specified $N_{HE-LTF}$ and $N_{LTF-REP}$ values. In selected embodiments, the AP device may be configured to compute UL-Length=13+$(N_{LTF-REP}+1)*N_{HE-LTF}*6$. As disclosed herein, the computed UL-Length value is derived based on the fact that there is no data packet with NDP PPDUs (e.g., $N_{SYM}=0$), and based on the simplified computation of the TXTIME parameters as TXTIME=44+$(N_{LTF-REP}+1)*N_{HE-LTF}*8$. As an alternative to computing the UL-Length value, the AP device may be configured to retrieve a lookup table of UL-Length values which were previously-computed for different combinations of $N_{HE-LTF}$ and $N_{LTF-REP}$ values.

At step 602, the AP device inserts the UL-Length value into the trigger frame. In selected embodiments, the AP device may be configured to insert the UL-Length value into the Common Info subfield of a trigger frame for an I2R NDP PPDU trigger frame, such as an HE-TB Ranging NDP trigger frame. In other embodiments, the AP device may generate a trigger frame which includes the computed UL-Length value and which has the format illustrated in FIG. 2.

At step 603, the AP device transmits the trigger frame as a downlink message to one or more STA devices as part of the ranging measurement procedure. Transmitting the trigger frame provides one or more STA devices with control information which allocates resources for the STA devices and solicits, from the STA devices, one or more uplink high efficiency (HE) PPDU transmissions which include LLEN subfield values.

At step 604, any STA device which receives the trigger frame may copy the UL-Length value from the trigger frame for use as the LLEN value in any response NDP PPDU. In selected embodiments, the STA device may generate the response NDP PPDU which has the format illustrated in FIG. 3 for a trigger based NDP PPDU 304.

At step 605, the STA device transmits the response NDP PPDU as an uplink message to the AP device as part of the ranging measurement procedure. Upon transmitting the response NDP PPDU, the STA device may record the transmission time when the response NDP PPDU was sent. And upon receiving the NDP PPDU, the AP device may record the reception time when the response NDP PPDU was received.

Subsequently, the AP device may transmit an NDPA PPDU as part of the ranging measurement procedure to notify the one or more STA devices that the AP/STA device will subsequently transmit one or more NDP PPDUs as part of the ranging measurement procedure.

Figure 6B:
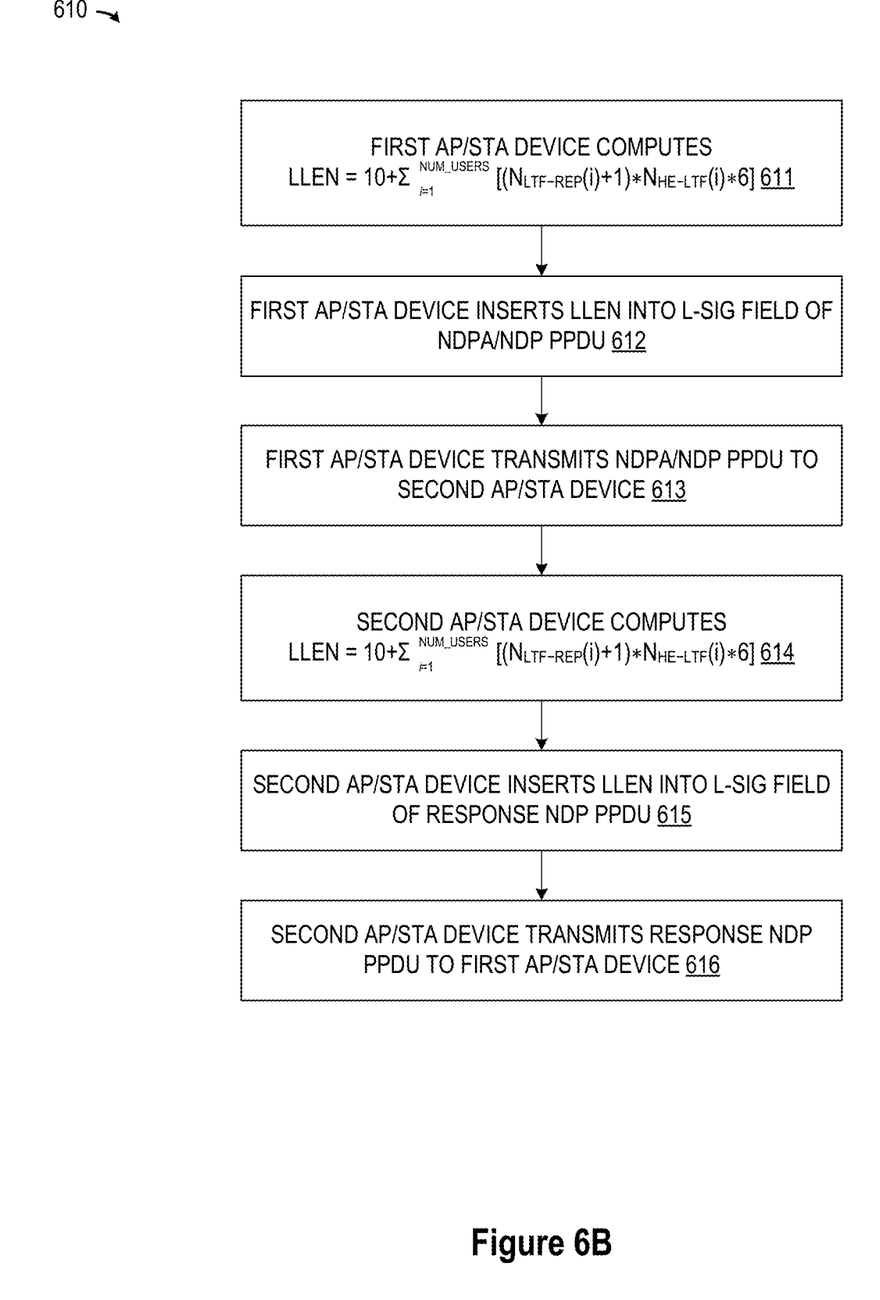
FIG. 6B depicts an exemplary logic flow diagram illustrating a processing sequence for using a legacy signal length value in a non-trigger-based protocol (single-user) for a measurement sounding process in accordance with selected embodiments of the present disclosure.

To provide additional details for an improved understanding of selected embodiments of the present disclosure, reference is now made to FIG. 6B which depicts an exemplary logic flow diagram 610 to illustrate a processing sequence for computing and using a legacy signal length value in a non-trigger-based protocol (single-user) for a measurement sounding process during a ranging measurement procedure. As disclosed herein, the network interface devices (e.g., 13, 23) may be configured to implement the method 610. In other embodiments, the method 610 is implemented by another suitable communication device. However implemented, the depicted logic flow and processing sequence are used by AP and STA devices to compute legacy signal length (LLEN) values from the specified number of symbols ($N_{HE-LTF}$) and number of repetitions ($N_{LTF-REP}$) for use with range sounding algorithms included in the 802.11az standard.

At step 611, a first AP or STA device performs an initial computation of a legacy signal length (LLEN) value for a null data packet announcement or null data packet frame based on specified $N_{HE-LTF}$ and $N_{LTF-REP}$ values. In selected embodiments, first the AP/STA device may be configured to compute LLEN=10+$\Sigma_{i=1}^{NUM\_USERS}(N_{LTF-REP}(i)+1)*N_{HE-LTF}(i)*6$. As disclosed herein, the computed LLEN value is derived based on the fact that there is no data packet with NDP PPDUs (e.g., $N_{SYM}=0$), and based on the simplified computation of the TXTIME parameters as TXTIME=40+$\Sigma_{i=1}^{NUM\_USERS}(N_{LTF-REP}(i)+1)*N_{HE-LTF}(i)*8$. As an alternative to computing the UL-Length value, the first AP/STA device may be configured to retrieve a lookup table of LLEN values which were previously-computed for different combinations of $N_{HE-LTF}$ and $N_{LTF-REP}$ values.

At step 612, the first AP/STA device inserts the LLEN value into the legacy signal field of the NDPA or NDP PPDU.

At step 613, the first AP/STA device transmits the NDPA or NDP PPDU frame as a downlink or uplink message to a second AP or STA device as part of the ranging measurement procedure. For example, an AP device may initiate a measurement sounding process by transmitting the NDPA/NDP PPDU frame to a STA device over a downlink PPDU. Alternatively, a STA device may initiate a measurement sounding process by transmitting the NDPA/NDP PPDU frame to an AP device over an uplink PPDU. Upon transmitting the NDP PPDU, the first AP/STA device may record the transmission time when the NDP PPDU was sent. And upon receiving the NDP PPDU, the second AP/STA device may record the reception time when the NDP PPDU was received.

At step 614, a second AP or STA device which receives the NDPA/NDP PPDU frame from the first AP/STA device may perform a computation of the legacy signal length (LLEN) value for any response NDP PPDU based on specified $N_{HE-LTF}$ and $N_{LTF-REP}$ values. In selected embodiments, the second AP/STA device may be configured to compute the L-SIG Length value as $LLEN=10+\Sigma_{i=1}^{NUM\_USERS}(N_{LTF-REP}(i)+1)*N_{HE-LTF}(i)*6$. As disclosed herein, the computed LLEN value is derived based on the fact that there is no data packet with NDP PPDUs (e.g., $N_{SYM}=0$), and based on the simplified computation of the TXTIME parameters as $TXTIME=40+\Sigma_{i=1}^{NUM\_USERS}(N_{LTF-REP}(i)+1)*N_{HE-LTF}(i)*8$. As an alternative to computing the LLEN value, the second AP/STA device may be configured to retrieve a lookup table of LLEN values which were previously-computed for different combinations of $N_{HE-LTF}$ and $N_{LTF-REP}$ values.

At step 615, the second AP/STA device inserts the LLEN value into the response NDP PPDU. In selected embodiments, the second AP/STA device may be configured to insert the LLEN value into the L-SIG subfield of a I2R/R2I NTB NDP and R2I TB NDP. In other embodiments, the second AP/STA device may generate a response NDP PPDU which has the format illustrated in FIG. 3 for a HE SU PPDU 301.

At step 616, the second AP/STA device transmits the response NDP PPDU to the first AP/STA device as part of the ranging measurement procedure. Upon transmitting the response NDP PPDU, the second AP/STA device may record the transmission time when the response NDP PPDU was sent. And upon receiving the NDP PPDU, the first AP/STA device may record the reception time when the response NDP PPDU was received.

Subsequently, the second AP/STA device may transmit a measurement report PPDU as part of the ranging measurement procedure to convey the recorded reception time when the NDP PPDU was received and the transmission time when the response NDP PPDU was transmitted by the second AP/STA device.

Figure 7:
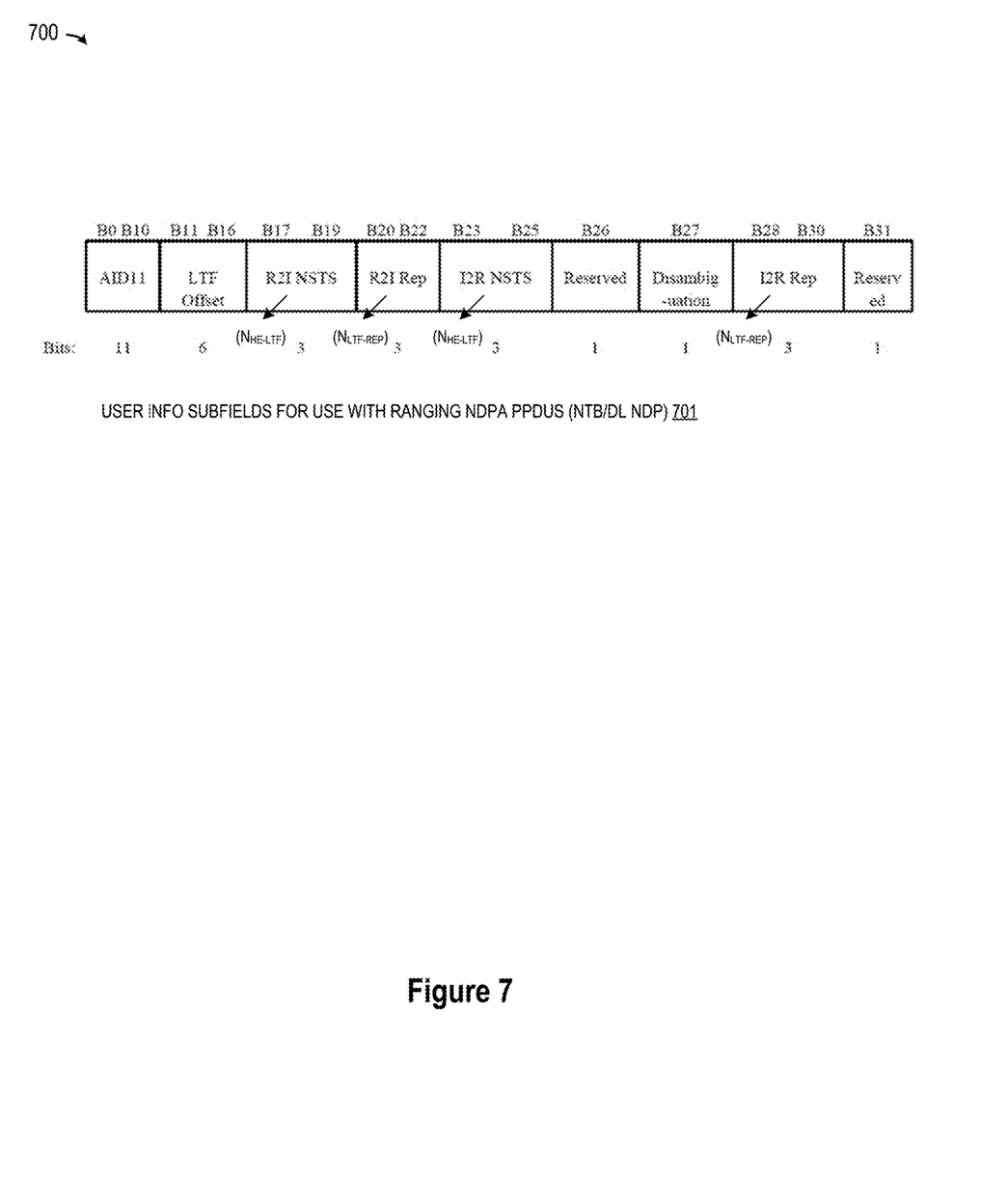
FIG. 7 is a format of a user or station information field with a detailed depiction of subfields used with non-trigger-based ranging NDP announcements in accordance with selected embodiments of the present disclosure.

To provide additional details for an improved understanding of selected embodiments of the present disclosure, reference is now made to FIG. 7 which depicts a format of a user or station information field 700 with a detailed depiction of subfields 701 used with ranging NDP announcements, such as non-trigger-based NDP PPDUs. As depicted, the "User Info Field" 701 includes a plurality of specified subfields, including an "AID11" subfield, "LTF Offset" subfield, "R2I NSTS" subfield, "R2I Rep" subfield, "I2R NSTS" subfield, "Disambiguation" subfield, "I2R Rep" subfield, and one or more "Reserved" subfields. With the depicted subfields 701 for the non-TB/DL NDP case, the L-SIG Length value (LLEN) is computed by the I2R or R2I NDP transmitter based on ranging NDP announcement PPDU which has R2I/I2R Rep subfields (for driving the $N_{LTF-REP}$ values) and I2R/R2I NSTS subfields (for driving the $N_{HE-TF}$ values), as depicted. For example, the "I2R Rep" subfield may be used to derive the number of HE-LTF repetitions ($N_{LTF-REP}$) as $N_{LTF-REP}=I2R\ Rep+1$, and the "R2I Rep" subfield may be used to derive the number of HE-LTF repetitions ($N_{LTF-REP}$) as $N_{LTF-REP}=R2I\ Rep+1$. Also, the "I2R NSTS" subfield may be used to derive the number of HE-LTF symbols ($N_{HE-LTF}$) using Table 1, and the "R2I NSTS" subfield may be used to derive the number of HE-LTF symbols ($N_{HE-LTF}$) using Table 1.

By now it should be appreciated that there has been provided an apparatus, method, and system for transmitting a null data packet (NDP) physical layer protocol data unit (PPDU) data unit in a wireless local area network in accordance with a High Efficiency (HE) communication protocol, such as the 802.11az communication protocol. In the disclosed methodology, a first STA device constructs the NDP PPDU data unit to include a trigger frame comprising an uplink (UL) length field element that is derived from a specified number of symbols ($N_{HE-LTF}$) and number of repetitions ($N_{LTF-REP}$) for the NDP PPDU data unit. In selected embodiments, the first STA device computes a UL-Length value for the UL length field element as $UL-Length=13+(N_{LTF-REP}+1)*N_{HE-LTF}*6$. In other embodiments, the first STA device uses the specified number of symbols ($N_{HE-LTF}$) and number of repetitions ($N_{LTF-REP}$) to retrieve a UL-Length value for the UL length field element from a lookup table of pre-computed UL-Length values. In the disclosed methodology, the first STA device subsequently sends the NDP PPDU data unit from the first STA device to a second STA device which generates, in response to the NDP PPDU data unit, an uplink response NDP PPDU data unit that is being solicited by the first STA device with the trigger frame. In selected embodiments, the NDP PPDU data unit is an HE trigger-based ranging NDP PPDU data unit wherein the UL length field element indicates a value of a L-SIG Length field of the uplink response NDP PPDU data unit that is being solicited from the second STA device by the first STA device in response to the trigger frame. In the disclosed methodology, the second STA device may construct the uplink response NDP PPDU data unit to include a legacy preamble comprising a legacy signal length (LLEN) field element which has a value copied from the UL length field element.

In another form, there is provided an apparatus, method, and system for transmitting a null data packet (NDP) physical layer protocol data unit (PPDU) data unit in a wireless local area network in accordance with a High Efficiency (HE) communication protocol, such as the 802.11az communication protocol. In the disclosed methodology, a first STA device constructs the NDP PPDU data unit to include a legacy preamble comprising a legacy signal length (LLEN) field element to convey a length measure for the PPDU data unit that is derived from a specified number of symbols ($N_{HE-LTF}$) and number of repetitions ($N_{LTF-REP}$) for the NDP PPDU data unit. In selected embodiments, the first STA device computes a LLEN value for the LLEN field element as $LLEN=10+\Sigma_{i=1}^{NUM\_USERS}(N_{LTF-REP}(i)+1)*N_{HE-LTF}(i)*6$. In other embodiments, the first STA device uses the specified number of symbols ($N_{HE-LTF}$) and number of repetitions ($N_{LTF-REP}$) to retrieve a LLEN value for the LLEN field element from a lookup table of pre-computed LLEN values. In the disclosed methodology, the first STA device subsequently sends the NDP PPDU data unit from the first STA device to a second STA device or an access point (AP) device. In selected embodiments, the NDP PPDU data unit is an I2R non-trigger-based NDP PPDU data unit or R2I non-trigger-based NDP PPDU data unit or an R2I trigger-based NDP PPDU data unit.

In yet another form, there is provided an apparatus, method, and system for transmitting one or more physical layer protocol data unit (PPDU) data frames in a wireless personal area network in accordance with a range measurement packet exchange of a High Efficiency (HE) communication protocol, such as the IEEE 802.11az communication protocol. As disclosed, the apparatus includes a transceiver to exchange data with a wireless device, a processor, and a memory which stores instructions. When executed by the processor, the instructions cause the apparatus to construct a null data packet (NDP) PPDU data frame to include a data frame signal length (LEN) value derived from a specified number of symbols (NHE-LTF) and number of repetitions ($N_{LTF-REP}$) for the NDP PPDU data frame. In addition, the processor-executed instructions cause the apparatus to transmit the NDP PPDU data frame from the apparatus to the wireless device. In selected embodiments where the NDP PPDU data frame includes a trigger frame, the data frame signal length (LEN) value is an uplink (UL) length (UL-Length) value which indicates a value of a legacy signal (L-SIG) Length field of an uplink response NDP PPDU data frame that is being solicited by the apparatus in response to the trigger frame. In such embodiments, the processor-executed instructions cause the apparatus to compute the UL-Length value as UL-Length=13+ $(N_{LTF-REP}+1)*N_{HE-LTF}*6$. Alternatively, the processor-executed instructions may cause the apparatus to obtain a UL-Length value by using the specified number of symbols ($N_{HE-LTF}$) and number of repetitions ($N_{LTF-REP}$) to retrieve a UL-Length value for the UL length field element from a lookup table of pre-computed UL-Length values. In other embodiments where the NDP PPDU data frame includes a legacy preamble, the data frame signal length (LEN) value is a legacy signal (L-SIG) Length (LLEN) value to convey a length measure for the PPDU data frame that is derived from the specified number of symbols ($N_{HE-LTF}$) and number of repetitions ($N_{LTF-REP}$) for the NDP PPDU data unit. In such embodiments, the processor-executed instructions cause the apparatus to compute the LLEN value as LLEN=10+$\sum_{i=1}^{NUM\_USERS}(N_{LTF-REP}(i)+1)*N_{HE-LTF}(i)*6$. Alternatively, the processor-executed instructions may cause the apparatus to obtain he LLEN value by using the specified number of symbols ($N_{LTE-LTF}$) and number of repetitions ($N_{LTF-REP}$) to retrieve a first LLEN value for the UL length field element from a lookup table of pre-computed UL-Length values. In other embodiments, the processor-executed instructions may cause the apparatus to compute the data frame signal length value as LEN=10+y+ $6*\sum_{i=1}^{NUM\_USERS}(N_{LTF-REP}(i)+1)*N_{HE-LTF}(i))$, where y=0 for a non-trigger-based I2R NDP PPDU data frame, a non-trigger-based R2I NDP PPDU data frame, or a trigger-based R2I NDP PPDU data frame, and where y=3 for trigger-based I2R NDP PPDU data frame.

Although the described exemplary embodiments disclosed herein are directed to a wireless communication station (STA) devices which use $N_{HE-LTF}$ and $N_{LTF-REP}$ parameter values to compute UL-Length and/or LLEN subfield values for NDP PPDUs in selected 802.11az-compliant wireless connectivity applications and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements may be used in order to configure NDP PPDUs with UL-Length and/or LLEN subfield values. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for soliciting by a trigger frame transmission of an uplink response null data packet (NDP) physical layer protocol data unit (PPDU) data unit in a wireless local area network in accordance with a High Efficiency (HE) communication protocol, comprising:

constructing, by a first station (STA) device, a PPDU data unit to include the trigger frame comprising a UL-Length value of an uplink (UL) length field element, the UL-Length value that is derived by a function with variables of only: (i) a specified number of symbols ($N_{HE-LTF}$) to be indicated in the PPDU data unit and (ii) number of repetitions ($N_{LTF-REP}$) to be indicated in the PPDU data unit; and sending the PPDU data unit from the first STA device to a second STA device which generates in response to the PPDU data unit the uplink response NDP PPDU data unit that is being solicited by the first STA device with the trigger frame, wherein the UL-Length value derived by the function indicates a length of the uplink response NDP PPDU data unit transmitted by the second STA device.

2. The method of claim 1, where the PPDU data unit comprises the UL length field element which indicates a value of a L-SIG Length field of the uplink response NDP PPDU data unit that is being solicited by the first STA device in response to the trigger frame.

3. The method of claim 1, further comprising computing the UL-Length value for the UL length field element as UL-Length=13+ $(N_{LTF-REP}+1)*N_{HE-LTF}*6$.

4. The method of claim 1, further comprising using the specified number of symbols (NHE-LTF) and number of repetitions ($N_{LTF-REP}$) to retrieve the UL-Length value for the UL length field element from a lookup table of pre-computed UL-Length values.

5. The method of claim 1, further comprising constructing, by the second STA device, the uplink response NDP PPDU data unit to include a legacy preamble comprising a legacy signal length (LLEN) field element which has a value copied from the UL length field element.

6. The method of claim 1, where the High Efficiency (HE) communication protocol comprises an Institute of Electrical and Electronics Engineers (IEEE) 802.11az communication protocol.

7. A method for transmitting a non-trigger based null data packet (NDP) physical layer protocol data unit (PPDU) data unit in a wireless local area network in accordance with a High Efficiency (HE) communication protocol, comprising:
constructing, by a first station (STA) device, the non-trigger based NDP PPDU data unit to include a legacy preamble comprising a LLEN value in a legacy signal length (LLEN) field element, the LLEN value to convey a symbol length for the non-trigger based NDP PPDU data unit, the LLEN value is derived by a function with variables of only: (i) a specified number of symbols ($N_{HE-LTF}$) for each user of a plurality of users receiving the non-trigger based NDP PPDU data unit; (ii) number of repetitions ($N_{LTF-REP}$) for each user of the plurality of users receiving the non-trigger based NDP PPDU data unit; and (iii) a number of the plurality of users receiving the non-trigger based NDP PPDU data unit; and
sending the NDP PPDU data unit from the first STA device to a plurality of second STA devices equal to the number.

8. The method of claim 7, where the NDP PPDU data unit comprises an I2R non-trigger-based NDP PPDU data unit or an R2I non-trigger-based NDP PPDU data unit.

9. The method of claim 7, further comprising computing a LLEN value for the LLEN field element as LLEN=10+ $\Sigma_{i=1}^{NUM\_USERS} (N_{LTF-REP}(i)+1)*N_{HE-LTF}(i)*6$.

10. The method of claim 7, further comprising using the specified number of symbols ($N_{HE-LTF}$) and number of repetitions ($N_{LTF-REP}$) to retrieve the LLEN value for the LLEN field element from a lookup table of pre-computed LLEN values.

11. The method of claim 7, where the High Efficiency (HE) communication protocol comprises an Institute of Electrical and Electronics Engineers (IEEE) 802.11az communication protocol.

12. An apparatus for soliciting by a trigger frame transmission of one or more uplink response null data packet (NDP) physical layer protocol data unit (PPDU) data frames in a wireless personal area network in accordance with a range measurement packet exchange of a High Efficiency (HE) communication protocol, comprising:
a transceiver to exchange data with a wireless device;
a processor; and
a memory storing instructions that, when executed by the processor, cause the apparatus to:
construct a PPDU data frame to include a data frame signal length (LEN) value, the LEN value that is derived by a function with variables of only: (i) a specified number of symbols ($N_{HE-LTF}$) to be indicated in the PPDU data frame and (ii) number of repetitions ($N_{LTF-REP}$) to be indicated in the PPDU data frame; and
transmit the PPDU data frame from the apparatus to the wireless device wherein the LEN value derived by the function indicates a length of the solicited uplink response NDP PPDU data unit transmitted by the wireless device.

13. The apparatus of claim 12, where the High Efficiency (HE) communication protocol comprises an Institute of Electrical and Electronics Engineers (IEEE) 802.11az communication protocol.

14. The apparatus of claim 12, where the PPDU data frame comprises the trigger frame, and where the data frame signal length (LEN) value comprises an uplink (UL) length (UL-Length) value which indicates a value of a legacy signal (L-SIG) Length field of the uplink response null data packet (NDP) PPDU data frame that is being solicited by the apparatus in response to the trigger frame.

15. The apparatus of claim 14, where the instructions stored in memory, when executed by the processor, cause the apparatus to compute the UL-Length value as UL-Length=13+$(N_{LTF-REP}+1)*N_{HE-LTF}*6$.

16. The apparatus of claim 14, where the instructions stored in memory, when executed by the processor, cause the apparatus to obtain a UL-Length value by using the specified number of symbols ($N_{HE-LTF}$) and number of repetitions ($N_{LTF-REP}$) to retrieve a UL-Length value for the UL length field element from a lookup table of pre-computed UL-Length values.

17. An apparatus for transmitting one or more physical layer protocol data unit (PPDU) data frames in a wireless personal area network in accordance with a range measurement packet exchange of a High Efficiency (HE) communication protocol, comprising:
a transceiver to exchange data with a wireless device;
a processor; and
a memory storing instructions that, when executed by the processor, cause the apparatus to:
construct the PPDU data frame to include a data frame signal length (LEN) value, the LEN value that is derived by function with two or three variables consisting of only: (i) a specified number of symbols ($N_{HE-LTF}$) to be indicated in the PPDU data frame; (ii) number of repetitions ($N_{LTF-REP}$) for the PPDU data frame to be indicated in the PPDU data frame; and (iii) a number of the plurality of users receiving the PPDU data frame; and
transmit the PPDU data frame from the apparatus to the wireless device wherein the LEN value derived by the function indicates a length of an uplink response NDP PPDU data unit transmitted by the wireless device when the PPDU data frame solicits the uplink response PPDU and a length of the PPDU data frame when the PPDU data frame is a non-trigger based NDP PPDU;
where the instructions stored in memory, when executed by the processor, further cause the apparatus to:
compute the data frame signal length value as LEN=10+ y+6*$\Sigma_{i=1}^{NUM\_USERS}((N_{LTF-REP}(i)+1)*N_{HE-LTF}(i))$, where y=0 for a non-trigger-based I2R NDP PPDU data frame, a non-trigger-based R2I NDP PPDU data frame, or a trigger-based R2I NDP PPDU data frame, and where y=3 for trigger-based I2R NDP PPDU data frame.

18. An apparatus for transmitting a non-trigger based null data packet (NDP) physical layer protocol data unit (PPDU) data unit in a wireless local area network in accordance with a High Efficiency (HE) communication protocol, comprising:

a transceiver to exchange data with a plurality of wireless devices;

a processor; and a memory storing instructions that, when executed by the processor, cause the apparatus to:

construct the non-trigger based NDP PPDU data unit to include a legacy preamble comprising a LLEN value in a legacy signal length (LLEN) field element, the LLEN value to convey a symbol length for the non-trigger based NDP PPDU data unit, the LLEN value is derived by a function with variables of only: (i) a specified number of symbols ($N_{HE\text{-}LTF}$) for each user of a plurality of users receiving the non-trigger based NDP PPDU data unit; (ii) number of repetitions ($N_{LTF\text{-}REP}$) for each user of the plurality of users receiving the non-trigger based NDP PPDU data unit; and (iii) a number of the plurality of users receiving the non-trigger based NDP PPDU data unit; and send the NDP PPDU data unit to the plurality of wireless devices equal to the number.

19. The apparatus of claim 18, where the instructions stored in memory, when executed by the processor, cause the apparatus to compute the LLEN value as $LLEN=10+\sum_{i=1}^{NUM\_USERS}(N_{LTF\text{-}REP}(i)+1)*N_{HE\text{-}LTF}(i)*6$.

20. The apparatus of claim 18, where the instructions stored in memory, when executed by the processor, cause the apparatus to obtain the LLEN value by using the specified number of symbols ($N_{HE\text{-}LTF}$) and number of repetitions ($N_{LTF\text{-}REP}$) to retrieve a first LLEN value from a lookup table of pre-computed LLEN values.

* * * * *